(12) United States Patent
DeMarco et al.

(10) Patent No.: US 10,045,143 B1
(45) Date of Patent: Aug. 7, 2018

(54) SOUND DETECTION AND IDENTIFICATION

(71) Applicant: INTERNATIONAL BUSINESS MACHINES CORPORATION, Armonk, NY (US)

(72) Inventors: Dominic L. DeMarco, Hyde Park, NY (US); Thomas D. Fitzsimmons, Lancaster, PA (US); Troy A. Flagg, Hyde Park, NY (US); Ryan P. Golden, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/634,300

(22) Filed: Jun. 27, 2017

(51) Int. Cl.
*H04R 29/00* (2006.01)
*G08B 7/06* (2006.01)
*G09B 21/00* (2006.01)

(52) U.S. Cl.
CPC ............. *H04R 29/008* (2013.01); *G08B 7/06* (2013.01); *G09B 21/009* (2013.01); *H04R 2499/11* (2013.01)

(58) Field of Classification Search
CPC ...... H04R 5/033; H04R 3/005; H04R 1/1016; H04R 2410/01
See application file for complete search history.

(56) References Cited

U.S. PATENT DOCUMENTS

| | | | |
|---|---|---|---|
| 7,356,473 B2 | 4/2008 | Kates | |
| 9,171,447 B2 | 10/2015 | Davis et al. | |
| 9,500,515 B2 | 11/2016 | Terjerina | |
| 2013/0070928 A1 | 3/2013 | Ellis et al. | |
| 2014/0300466 A1* | 10/2014 | Park | G08B 19/00 340/539.11 |
| 2015/0061856 A1* | 3/2015 | Raman | B60Q 9/00 340/457 |
| 2016/0125885 A1 | 5/2016 | Betts et al. | |
| 2016/0188284 A1* | 6/2016 | Lu | H04R 5/04 381/74 |
| 2016/0255944 A1 | 9/2016 | Baranski et al. | |
| 2016/0300462 A1 | 10/2016 | Cocuzza et al. | |
| 2016/0360384 A1* | 12/2016 | Park | H04W 4/12 |
| 2016/0381450 A1* | 12/2016 | Taite | H04L 12/1818 381/74 |
| 2017/0011406 A1* | 1/2017 | Tunnell | G06Q 20/40145 |
| 2017/0117004 A1* | 4/2017 | Lee | G10L 25/51 |
| 2017/0194020 A1* | 7/2017 | Miller | G10L 25/51 |

FOREIGN PATENT DOCUMENTS

WO 2008067638 A1 6/2008

* cited by examiner

*Primary Examiner* — Mohammad Islam
(74) *Attorney, Agent, or Firm* — Cantor Colburn LLP; Steven Chiu

(57) ABSTRACT

Embodiments include method, systems and computer program products for sound identification. Aspects include receiving, by a processor in a wearable electronic device, an indication of an audio signal. The audio signal is analyzed to determine an audio source and based at least in part on the audio source, non-auditory feedback is provided to a user of the wearable electronic device.

17 Claims, 6 Drawing Sheets

SOUND DETECTION AND IDENTIFICATION

BACKGROUND

The present invention generally relates to sound identification, and more specifically, to sound detection and identification to provide feedback to a user of an electronic device.

On any given day, an individual is subjected to a multitude of sounds coming from a variety of sources including other people, machines, and nature. The identification of a sound depends on a subjective analysis by a person based on their experiences with different types of sounds. In addition, identifying the location of a sound and where it is coming from with respect to an individual's location relies again on the individual's experience.

However, certain individuals may not have the ability to hear and distinguish sounds due to disability or the age of the individual. Audio signal processing techniques can assist with identification and classification of certain sounds based on acoustic properties of the audio signal. Identification and classification of a sound for an individual unable to hear or distinguish sounds can help enable autonomy of the individual.

SUMMARY

Embodiments of the present invention are directed to a computer-implemented method for sound identification. A non-limiting example of the computer-implemented method includes receiving, by a processor in a wearable electronic device, an indication of an audio signal. The audio signal is analyzed to determine an audio source and based at least in part on the audio source, non-auditory feedback is provided to a user of the wearable electronic device.

Embodiments of the present invention are directed to a system for sound identification. A non-limiting example of the system includes receiving, by a processor in a wearable electronic device, an indication of an audio signal. The audio signal is analyzed to determine an audio source and based at least in part on the audio source, non-auditory feedback is provided to a user of the wearable electronic device.

Embodiments of the invention are directed to a computer program product for sound identification, the computer program product comprising a computer readable storage medium having program instructions embodied therewith. The program instructions are executable by a processor to cause the processor to perform a method. A non-limiting example of the method includes receiving, by a processor in a wearable electronic device, an indication of an audio signal. The audio signal is analyzed to determine an audio source and based at least in part on the audio source, non-auditory feedback is provided to a user of the wearable electronic device.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
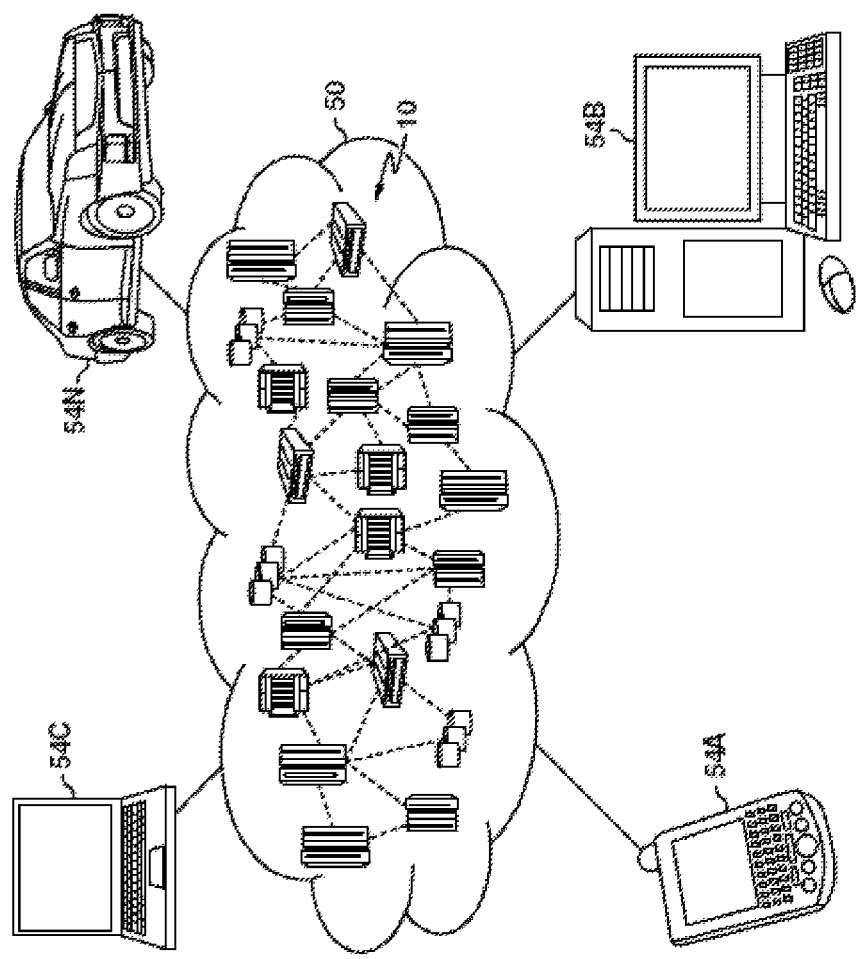
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
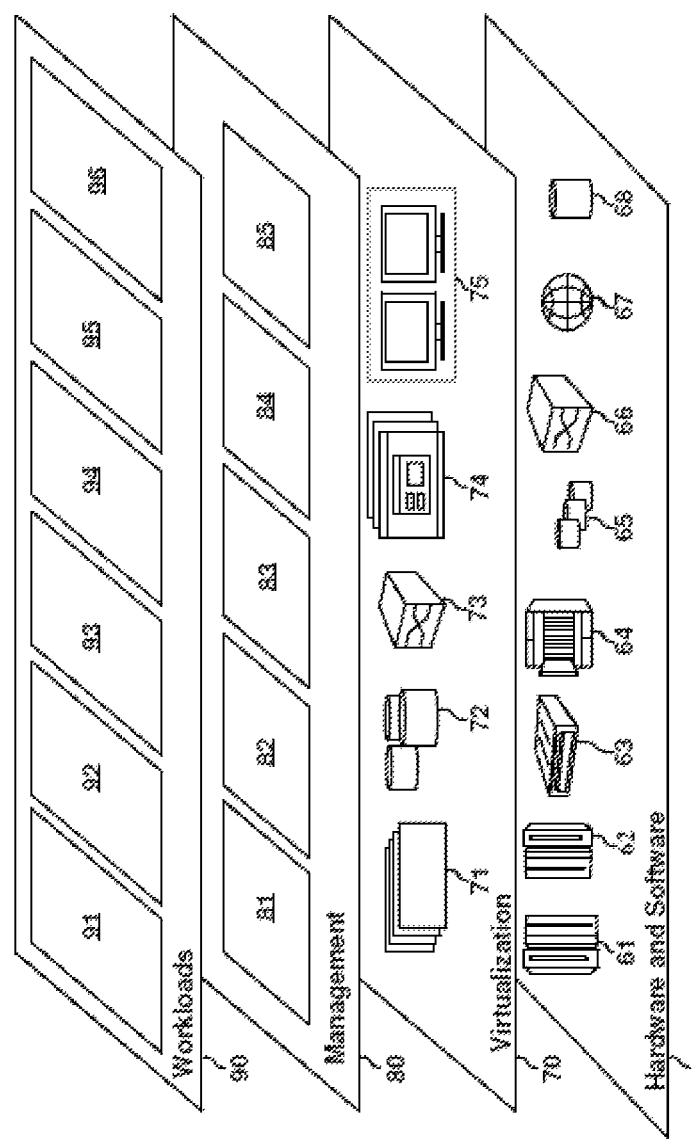
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sound identification and alert 96.

Figure 3:
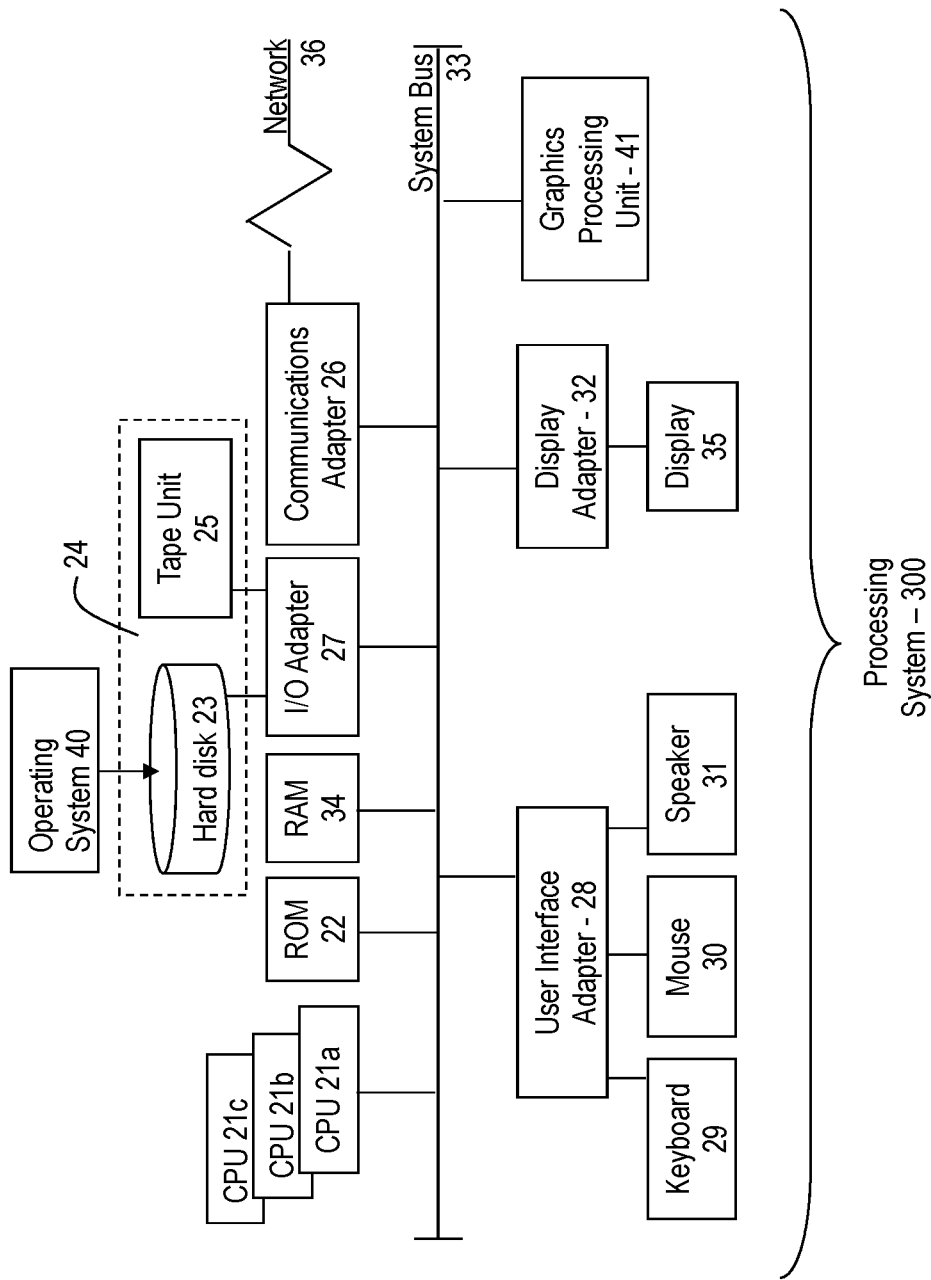
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

One or more embodiments of the invention provide for methods, systems, and computer program products for sound identification. The system for sound identification can be implemented utilizing an electronic device, such as, for example, a smart watch or smartphone. The electronic device utilizes sensors to detect sounds to determine a source of the sound and also to identify the type of sound. Based on the source and the type of sound, a user of the electronic device can receive feedback (sometimes referred to as an alert) from the electronic device in the form or an audio, visual, and/or haptic signal. For example, if the electronic device determines the audio source and type of sound to be a dangerous sound, the device can provide a strong vibration for the user to notify the user of the potential for danger.

Aspects of the invention include receiving, by a sensor, an indication of an audio signal and determining an audio source and audio type for the audio signal. The sensor can be housed within a wearable electronic device or the sensor can be separate but in electronic communication with the electronic device. Types of audio signals include but are not limited to human voices, animals, and inanimate objects such as motor vehicles. Human voices, for example, are unique and can be recognized utilizing any suitable voice recognition algorithm. Feedback can be provided to a user based at least in part on the audio source and audio type for the audio signal. A potential application for this system for sound recognition could be for an individual who is hearing impaired who can receive notifications in the form of a vibration or visual signal. For example, if a user's friend is attempting to communicate with the user from behind the user, the electronic device can detect the friend's voice and provide feedback to the user to notify the user of the friend attempting to make contact with the user. Similarly, if the user is unable to hear cars and a car is using its horn in the vicinity of the user, the user can be alerted to the potential for danger. The feedback can be different based on a risk level determined based at least in part on the audio source and audio type. In the example with the user's friend, a slight vibration can be utilized. However, in the car horn example, the feedback can be a heavy vibration and/or a flashing light on a screen of the electronic device. In the cases where there is a high risk, the feedback can be configured to grab a user's attention to alert the user to a high risk situation.

Figure 4:
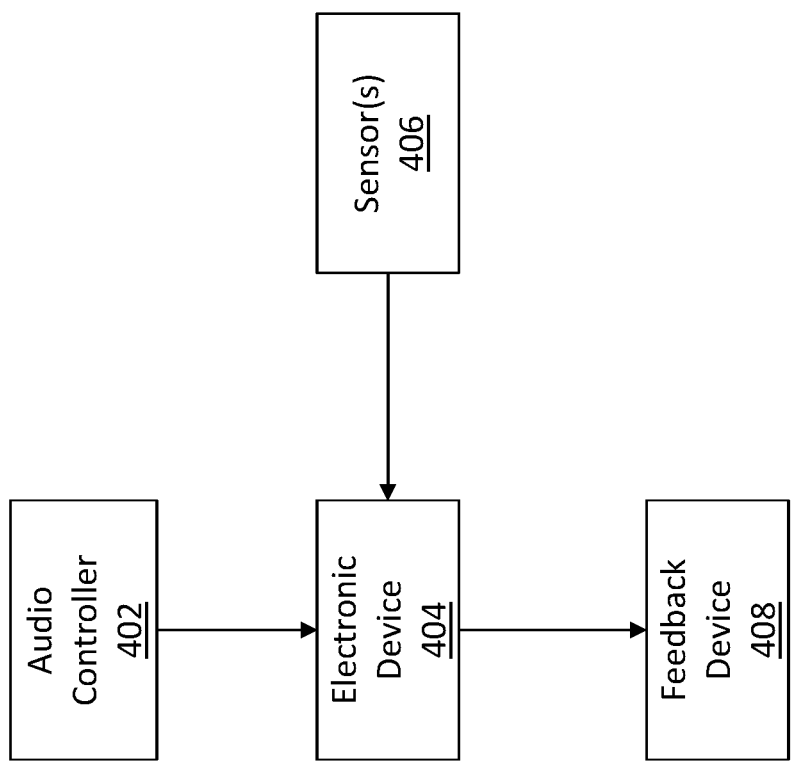
FIG. 4 depicts a block diagram of a system for sound identification according to one or more embodiments of the present invention.

Turning now to a more detailed description of aspects of the present invention, FIG. 4 depicts a block diagram of a system for sound identification according to embodiments of the invention. The system 400 includes an audio controller 402, an electronic device 404, one or more sensor(s) 406, and a feedback device 408.

In one or more embodiments of the invention, the audio controller 402 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In one or more embodiments of the invention, the electronic device 404 can include a smart watch, the smartphone, smart glasses, and any other wearable or non-wearable electronic device. The audio controller 402 can be an application on the electronic device 404 or a separate application located on a server in electronic communication with the electronic device 404. The electronic device 404 is in electronic communication with the one or more sensors 406. The one or more sensors 406 can be local to the electronic device 404. For example, the one or more sensors 406 can be a microphone housed within a smart watch or any other smart device. The sensors 406 can be separate from the electronic device 404 and in electronic communication with a network cloud. The electronic device 404 can pull data from the network cloud or from the sensors 406 directly through any type of connection such as, for example, a wireless network connection.

The electronic device 404 is operable to receive one or more audio signals through one or more sensors 406. The audio controller 402 analyzes the one or more audio signals to determine the sources of the one or more audio signals. Signal processing techniques can be utilized to determine acoustic properties of the audio signal to determine the audio source as well as an audio type. The source (i.e., origination location) of the audio signal can be determine based on acoustic properties in relation to the location of the one or more sensors 406. For non-human audio sources, the audio controller 402 can determine data associated with the audio signal such as, for example, the type of audio, whether the source is moving in relation to the electronic device 404 and/or one or more sensors 406, the direction the source is moving, the movement velocity of the source, and the like. Similarly, for humans, the audio controller 402, in addition to the data described in the non-human audio sources, can utilize speaker recognition techniques to determine an identity of the human speaker. Also, the audio controller 402 can recognize the audio from the human speaker and transcribe the audio into a text format using speech to text (STT) techniques. In one or more embodiments of the invention, the speech to text can be displayed on a display screen of the electronic device 404. For example, a smartwatch can receive audio from a human speaker and transcribe the audio into text for display on the display screen. An individual that has difficulty hearing can refer to his or her smartwatch when conversing with another individual.

In one or more embodiments of the invention, a user of the electronic device 404 can receive feedback from the feedback device 408. The feedback device 408 can be within the electronic device 404 or separate from the electronic device 404 but in electronic communication with the electronic device 404. The feedback device 408 can provide feedback to a user in the form of an audio, visual, and/or haptic signal originating from the feedback device 408, the electronic device 404, or from another device(s). The feedback device 408 can be a motor disposed within the electronic device 404 that can cause various vibrations such as strong or weak vibration. The vibrations can also be patterned such as pulses every other second and the like. The feedback device 408 can also be a display screen of the electronic device 404 that is operable to display visual feedback to the user. The feedback device 408 can be multiple devices wearable by a user that are capable of providing haptic and/or visual feedback to the user. For example, the electronic device 404 can be a phone that a user carries and the feedback device(s) 408 can be a smart watch in electronic communication with the phone. Detection of an audio signal can cause the smart watch and/or the phone to vibrate. The vibration (haptic feedback) can be of an intensity that alerts the user of a potential risk level of the audio signal, such as a car horn or barking dog.

In one or more embodiments of the invention, the audio controller 402 receives an indication of an audio signal. The indication can be received from the detection of an audio signal by the one or more sensors 406. The audio controller 402 analyzes the audio signal to determine a source, type, location, and other acoustic characteristics. Based on this, a risk level can be determined. The other acoustic characteristics can include volume, intensity, and the like. The risk level can be set at levels such as high, moderate, and low or can have a numerical score. The risk level can also be a color coded risk for display to a user such as red, yellow, and green. Risk levels above a certain threshold can modify the feedback sent to the user. For example, a high risk level or risk level above a threshold can have a strong and intense haptic feedback such as a strong vibration or a patterned vibration that is utilized to draw attention from the user.

In one or more embodiments of the invention, the audio controller 402 can utilize the feedback device 408 to provide directional feedback to indicate a location of an audio source for the user. For example, a motor within a smartwatch can vibrate to indicate a direction of an audio source. Or, the display screen of the electronic device can present an image that would indicate the location of the audio source with respect to the location of the user, such as an arrow pointed in the direction of the source of the audio. In some embodiments of the invention, the feedback device 408 can provide feedback to a user to lead the user away from a potential, high risk sound. For example, based on the determination that a car horn is traveling towards a user, the feedback device 408 can provide feedback that directs the user to move in a certain direction to avoid the car horn. The feedback intensity can indicate a severity of the risk to the user based on the identified audio source. For example, if the audio controller 402 determines the risk level to be high based on the audio source moving towards the user, the feedback to the user can be a displayed arrow indicating the user should move in the direction of the arrow to avoid the audio source. A patterned vibration can also be utilized to influence a user to move to safety. For example, for a smartwatch, a motor within the smartwatch can cause a vibration pattern on a portion of the smartwatch such as the left side to direct the user to avoid the left side or to draw the user to the left side depending on the vibration pattern.

In one or more embodiments of the invention, a user of the electronic device 404 can provide a confirmation or a rejection input based on the identified audio type or audio source. For example, the audio controller 402 can determine a sound to be a car horn and notify the user that the audio source is from a car. If the user determines that the sound came from a different source, the user can input a rejection of the audio source and the audio controller 402 can update the algorithm used to identify the audio source. The algorithm for determining the audio system can be any suitable algorithm including a machine learning algorithm. The user inputs can confirm or reject the audio source identification and update the machine learning algorithm. Additionally, a user can provide additional inputs that help identify unknown sounds that the electronic device 404 detects but is unable to identify. The user can identify the sounds to assist with teaching a machine learning algorithm by providing labeled training data for the machine learning algorithm. For example, if the audio controller 402 identifies a sound as emanating from a known individual speaking to the user, the user can confirm that this is a correct identification once the user confirms that the known individual is present.

In one or more embodiments of the invention, for audio sources determined to be known to the user, the electronic device 404 that includes a display screen can display an image of the audio source. For example, if a friend of the user is talking, the display screen will display a picture of the friend to indicate to the user that the friend is talking to the user.

In one or more embodiments of the invention, the one or more sensors 406 located separately from the electronic device 404 can have fixed locations and/or orientations. For example, a user of the electronic device 404 can have one or more sensors 406 set up within the user's home or office for collection of audio data. The electronic device 404 can be equipped with a global positioning system (GPS) or any other type of position determining system. The one or more sensors 406 locations are known to the electronic device 404 and the audio controller 402 can analyze acoustic properties of any audio signals to determine an audio source location and audio source type. In some embodiments of the invention, the one or more sensors 406 can have variable locations and orientations. For example, the sensors can be affixed to hovering autonomous drones near a user for detecting sound around the user.

In one or embodiments of the invention, the one or more sensors 406 can be located in a larger area such as a city. The one or more sensors 406 can determine an audio level of the city along a specified path for a user. For example, a user can enter a specified route the user would like to travel within the city. The user can specify for this route a certain audio tolerance. For example, a user may wish to have a quite walk or run on a specified route. Based on the one or more sensors 406 along the specified route, an audio level can be determined. If the audio level is above a certain threshold, the electronic device 404 can recommend an alternate route for the user that is below the threshold audio level.

In one or more embodiments of the invention, the electronic device 404 can be a self-propelled machine, such as, for example, a drone or an autonomous vacuum cleaner. The audio controller 402 can collect audio data collected from one or more sensors 406 in electronic communication with the electronic device 404 to determine if an object may collide with electronic device 404 based at least in part on the audio data. For example, a drone can be hovering in a position with a camera fixated in one direction. An object, such as a bird or another drone, can be on a collision path of the drone but might be emitting an audio signal that the drone sensors 406 can receive and determine a direction and velocity with respect to the location of the drone. Based at least in part on the direction and velocity, the drone can move to avoid a collision.

Figure 5:
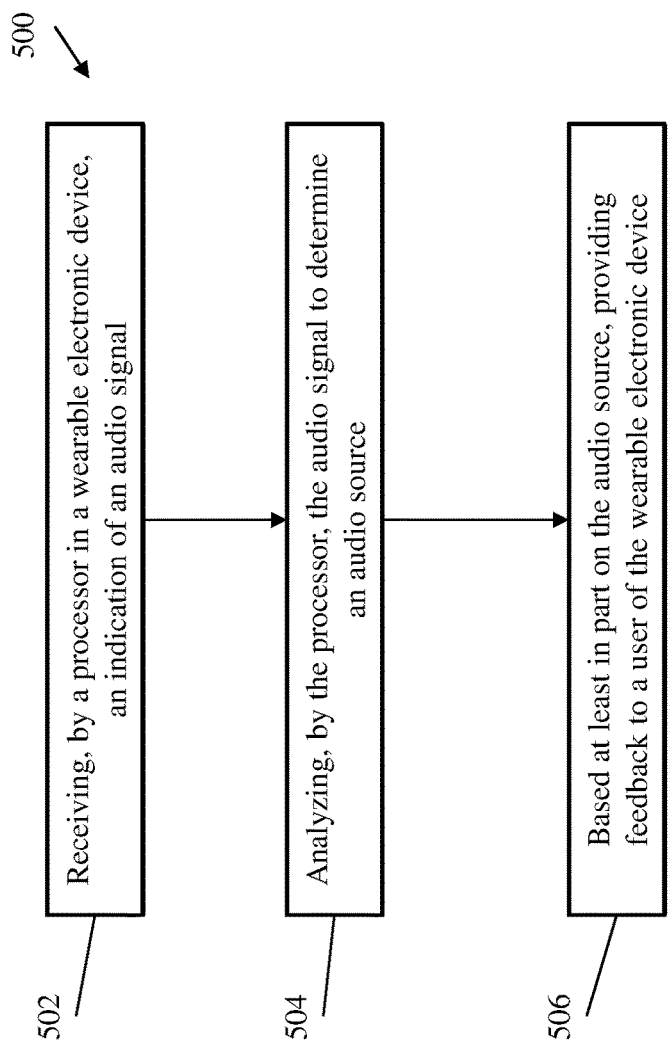
FIG. 5 depicts a flow diagram of a method for sound identification according to one or more embodiments of the invention.

FIG. 5 depicts a flow diagram of a method for sound identification according to one or more embodiments of the invention. The method 500 includes receiving, by a processor in a wearable electronic device, an indication of an audio signal, as shown in block 502. The method 500, at block 504, includes analyzing, by the processor, the audio signal to determine an audio source. And based at least in part on the audio source, the method 500 includes providing non-auditory feedback to a user of the wearable electronic device, as shown at block 506.

Additional processes may also be included. It should be understood that the processes depicted in FIG. 5 represent illustrations, and that other processes may be added or existing processes may be removed, modified, or rearranged without departing from the scope and spirit of the present disclosure.

Figure 6:
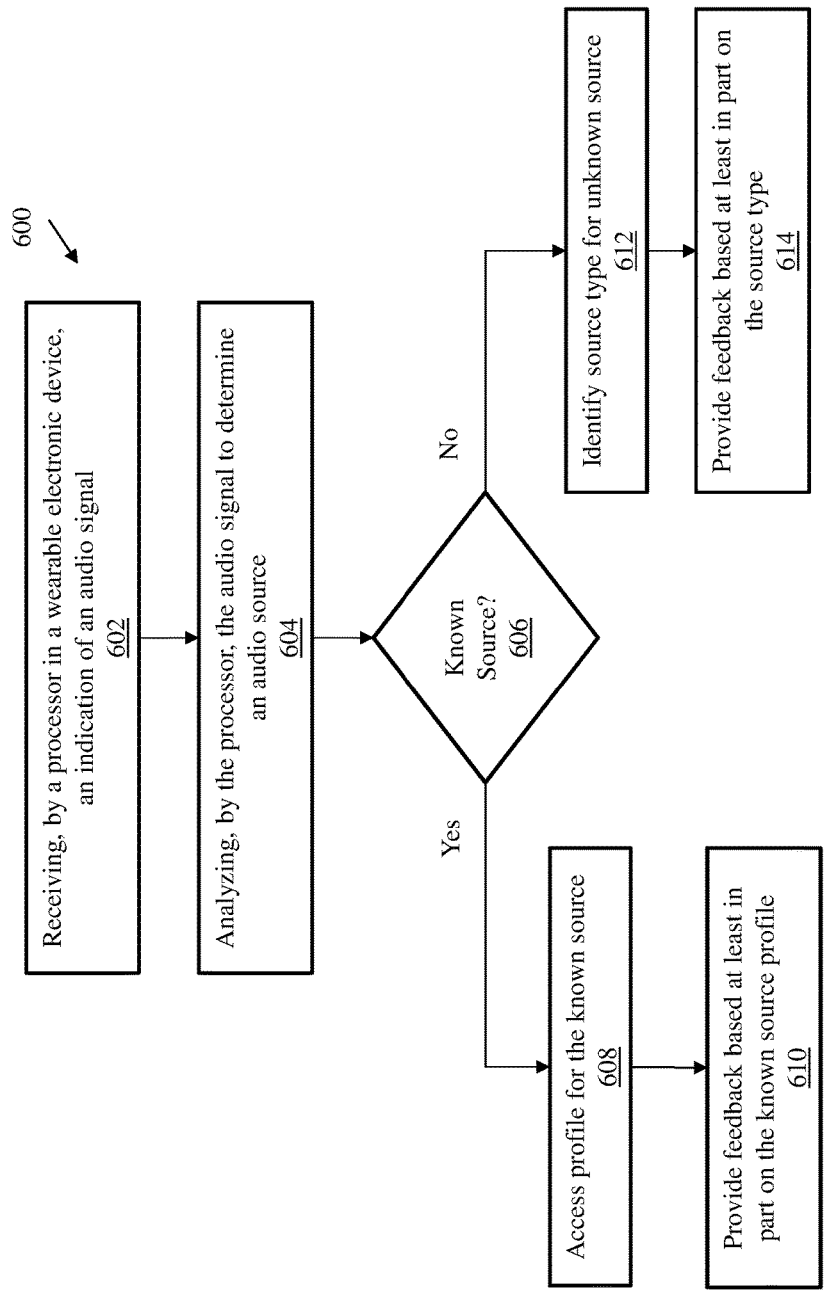
FIG. 6 depicts a flow diagram of a method for sound identification according to one or more embodiments of the invention.

FIG. 6 depicts a flow diagram of a method for sound identification according to one or more embodiments of the invention. The method 600 includes receiving, by a processor in a wearable electronic device, an indication of an audio signal, as shown at block 602. The indication can be any indication including the detection of an audio signal by a sensor attached to the wearable device or in electronic communication with the wearable device. Additional indications can be received from remote sensors located in areas separate from the wearable device. For example, if a user is on a walk and wants to avoid congested areas, sensors located further down in the user's walking direction can receive audio signals indicating a large amount of congestion. Once determined that the area is congested, the sensors can send an indication of a congested area ahead and the user can take a different walking route. At block 604, the processor analyzes the audio signal to determine the audio source. At the decision block 606, the method 600 includes a determination as to whether the source is known to the user. If the source is known to the user, the method 600 includes accessing a known source profile 608. For example, if the audio source is a friend of the user, the user can store the friend's profile in the wearable device or in a cloud database accessed by the wearable device. Based on the known source profile, the method 600 includes providing feedback based on the source profile, as shown at block 610. This can include displaying an image of the known source on a display screen of the wearable device. For example, if a friend approaches a user, the wearable device can identify the friend based on his or her voice and display a profile picture of the friend to the user on the display of the wearable device. If the source is not known, at block 606, the method 600 includes identifying the source type as shown at block 612. Feedback is provided based at least in part on the source type as shown at block 614. For example, if the audio source is a car horn, the display screen of a wearable device can display a picture of a car.

Additional processes may also be included. It should be understood that the processes depicted in FIG. 6 represent illustrations, and that other processes may be added or existing processes may be removed, modified, or rearranged without departing from the scope and spirit of the present disclosure.

Technical benefits include providing autonomy to individuals with limited hearing ability. Typically, a user with limited hearing ability would rely on a companion to assist in guiding them through areas with the potential for danger. The wearable electronic device that processes audio signals and provides feedback to the user can assist the user with avoiding potential risks associated with their limited hearing ability.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for sound identification, the method comprising:
    receiving, by a processor in a wearable electronic device, an indication of an audio signal;
    analyzing, by the processor, the audio signal to determine an audio source;
    based at least in part on the audio source, providing non-auditory feedback to a user of the wearable electronic device;
    analyzing the audio source to determine a risk level, wherein the determination of risk level comprises:
        determining a movement of the audio source, wherein the movement includes a source velocity and a source direction;
        based at least in part on the source velocity being above a threshold velocity and based at least in part on the source direction being in a direction of the user, increasing the risk level; and
    based at least in part on the risk level, adjusting the feedback to the user of the wearable electronic device.

2. The method of claim 1, wherein the indication of the audio signal is received from a sensor disposed within the wearable electronic device.

3. The method of claim 1, wherein the indication of the audio signal is received from a sensor separate from the wearable electronic device.

4. The method of claim 1, wherein the feedback to the user of the electronic device is a haptic alert.

5. The method of claim 4, wherein an intensity of the haptic alert is based at least in part on the risk level.

6. The method of claim 1, wherein the feedback to the user of the electronic device is a visual alert.

7. The method of claim 1, wherein the feedback to the user indicates a location of the audio source with respect to the user.

8. The method of claim 1 further comprising:
    based at least in part on the source direction, providing feedback indicating a suggested movement direction for the user.

9. A system for sound identification, the system comprising a processor coupled to a memory in a wearable electronic device, the processor configured to:
    receive an indication of an audio signal;
    analyze the audio signal to determine an audio source;
    based at least in part on the audio source, provide feedback to a user of the wearable electronic device;
    analyze the audio source to determine a risk level, wherein the determination of risk level comprises:
        determining a movement of the audio source, wherein the movement includes a source velocity and a source direction;
        based at least in part on the source velocity being above a threshold velocity and based at least in part on the source direction being in a direction of the user, increasing the risk level; and
    based at least in part on the risk level, adjust the feedback to the user of the wearable electronic device.

10. The system of claim 9, wherein the indication of the audio signal is received from a sensor disposed within the wearable electronic device.

11. The system of claim 9, wherein the indication of the audio signal is received from a sensor separate from the wearable electronic device.

12. The system of claim 9, wherein the feedback to the user of the electronic device is a haptic alert.

13. A computer program product for sound identification, the computer program product comprising a computer readable storage medium having program instructions embodied therewith, the program instructions executable by a processor to cause the processor to perform:
    receiving, by a wearable electronic device, an indication of an audio signal;
    analyzing the audio signal to determine an audio source;
    based at least in part on the audio source, providing feedback to a user of the wearable electronic device;
    analyzing the audio source to determine a risk level, wherein the determination of risk level comprises:
        determining a movement of the audio source, wherein the movement includes a source velocity and a source direction;
        based at least in part on the source velocity being above a threshold velocity and based at least in part on the source direction being in a direction of the user, increasing the risk level; and
    based at least in part on the risk level, adjusting the feedback to the user of the wearable electronic device.

14. The computer program product of claim 13, wherein the indication of the audio signal is received from a sensor disposed within the wearable electronic device.

15. The computer program product of claim 13, wherein the indication of the audio signal is received from a sensor separate from the wearable electronic device.

16. The computer program product of claim 13, wherein the feedback to the user of the electronic device is a haptic alert.

17. The computer program product of claim 16, wherein an intensity of the haptic alert is based at least in part on the risk level.

* * * * *